United States Patent [19]

Wang et al.

[11] Patent Number: 5,023,385

[45] Date of Patent: Jun. 11, 1991

[54] NOVEL HALIDE-ARYLALKOXY-CONTAINING MAGNESIUM COMPOUNDS

[75] Inventors: Bor-Ping E. Wang, Ossining; Elliot I. Band, North Tarrytown; Richard J. Amata, Peekskill, all of N.Y.

[73] Assignee: Akzo nv, Arnhem, Netherlands

[21] Appl. No.: 497,295

[22] Filed: Mar. 22, 1990

[51] Int. Cl.$^5$ ............................................. C07C 31/30
[52] U.S. Cl. ...................... 568/851; 568/715; 568/716
[58] Field of Search ............... 568/851, 715, 716, 812

[56] References Cited

U.S. PATENT DOCUMENTS

| | | | |
|---|---|---|---|
| 4,727,051 | 2/1988 | Breen et al. | 568/851 |
| 4,792,640 | 12/1988 | Mehta | 568/851 |
| 4,820,672 | 4/1989 | Mehta | 568/851 |
| 4,820,879 | 4/1989 | Mehta | 568/851 |

*Primary Examiner*—Werren B. Lone
*Attorney, Agent, or Firm*—Richard P. Fennelly; Louis A. Morris

[57] ABSTRACT

Halide arylalkoxy-containing compounds of the formula ROMgX, where X is halide (e.g., chloride) and R is aralkyl (e.g., benzyl) are hydrocarbon soluble.

12 Claims, No Drawings

NOVEL HALIDE-ARYLALKOXY-CONTAINING MAGNESIUM COMPOUNDS

BACKGROUND OF THE INVENTION

U.S. Pat. Nos. 4,792,640 and 4,820,879 to V. C. Mehta both describe hydrocarbyloxy magnesium halides of the general formula ROMgX, where X is halide, such as chloride, and where R can be alkyl, cycloalkyl, aryl, or aralkyl. Example 9 of the '640 patent specifically describes the formation of a phenoxymagnesium chloride solid.

SUMMARY OF THE INVENTION

It has now been unexpectedly found that novel halide/arylalkoxy-containing magnesium complexes which are soluble in hydrocarbon solvents and which comprise the novel compounds described below can be formed in accordance with the present invention.

DESCRIPTION OF THE INVENTION

The novel compounds of the present invention are of the formula ROMgX where X is halide, such as chlorine, and R is aralkyl and is of the formula R'R"OH where R' is phenyl and R" is alkylene of from 1 to 6 carbon atoms. Representative compounds of this type include benzyl alcohol. An unexpected characteristic of such compounds is their solubility in hydrocarbon solvent in view of the teaching of Example 9 of U.S. Pat. No. 4,792,640 that phenoxymagnesium chloride (where R' is phenyl and R" is not present) is a solid.

The Examples which follow illustrate how the novel and nonobvious compounds described herein can be formed. An inert hydrocarbon solvent (e.g., toluene), aralkanol (e.g., benzyl alcohol), and alcohol (ethanol) can be added to magnesium halide ($MgCl_2$) and heated to dissolve the magnesium halide. Magnesium metal is then added and the resulting mixture is heated until the metal dissolves. If desired, a dialkylmagnesium compound can be used as the magnesium source if expense is not of serious concern.

Further details regarding the synthesis of this novel class of compound is set forth below in the Examples which follow and in U.S. Ser. No. 497,293, filed on even date herewith, and entitled "Process for Making Halide-/Alkoxy-Containing Magnesium Complex" the entire text of which is incorporated herein.

EXAMPLE 1

This Example illustrates the preparation of a hydrocarbon-soluble chloromagnesiumalkoxide in accordance with the present invention. The preparation was conducted under a nitrogen atmosphere The toluene, ethanol, and benzyl alcohol were dried over molecular sieve resin. Magnesium chloride (22.3 grams, 0.234 mole, under 0.2% water content) was weighed and charged into a 500 ml round bottom flask equipped with stir bar coated with TEFLON fluoropolymer. The vessel was purged with nitrogen. A solution of pure toluene (84 grams), benzyl alcohol (70 grams, 0.647 mole), and absolute ethanol (24.46 grams, 0.532 mole) was then added to the vessel. The vessel was heated to about 100° C. for about 20 minutes with stirring until the $MgCl_2$ became dissolved. Magnesium metal turnings (5.65 grams, 0.232 mole) were added to a separate three-neck flask equipped with a mechanical stirrer, dropping funnel, gas inlet, outlet, and solids addition port. Toluene (reagent grade, 43.7 grams) was then added followed by 1.0 gram of butyl ethyl magnesium (10.5% in heptane, 0.022 grams Mg, $9.1 \times 10^{-4}$ mole) The vessel was heated to about 105° C. for 15 minutes with stirring, and was then cooled. The toluene solution which contains $MgCl_2$/benzyl alcohol/ethanol was transferred into a dropping funnel through a tube of TEFLON fluoropolymer and then was added dropwise into the vessel with stirring. The vessel's temperature was maintained at about 90° C. for the addition of the remaining solution. After the addition, the vessel was heated to reflux (about 105° C.) and was maintained at that temperature with stirring for one hour. The vessel was cooled, and the liquid was slowly filtered through a 0.5 micron filter. The filtrate was a colorless mobile solution.

The filtrate was mixed with 140.3 grams of toluene to prepare a final solution of 20% $ClMgOC_7H_7$ in toluene/ethanol/benzyl alcohol. The final theoretical composition of the solution was:

| | |
|---|---|
| $ClMgOC_7H_7$ | 78 grams |
| "Free" benzyl alcohol | 19.5 grams |
| "Free" ethanol | 24.5 grams |
| Toluene | 268 grams |
| Total | 390 grams |

Estimated "Free Alcohol": 11.28% wt.

EXAMPLE 2

A 500 ml three-neck flask was equipped with a mechanical stirrer, condenser, gas inlet, outlet and solids addition port. The vessel was purged with nitrogen for 30 minutes replacing the atmosphere with nitrogen.

To this flask was added 103 grams of toluene through a syringe. Under stirring, 59.8 grams (0.553 mole) of benzyl alcohol and 22.2 grams (0.482 mole) of ethanol were charged into the flask. The solution was heated to 80° C. Magnesium chloride (22.3 grams, 0.234 mole) was added slowly through the solids addition port. After the addition was complete, the flask was heated to about 100° C. for 15 minutes until the $MgCl_2$ became dissolved, was then cooled to 75° C., and magnesium metal was added rapidly through the solids addition port under slow nitrogen flow. After the addition, the vessel was heated to reflux temperature and was maintained at that temperature with stirring for two hours. The filtration step was the same as in Example 1. The final theoretical composition of this solution was:

| | |
|---|---|
| $ClMgOC_7H_7$ | 78 grams |
| "Free" benzyl alcohol | 9.3 grams |
| "Free" ethanol | 22.2 grams |
| Toluene | 280.5 grams |
| Total | 390 grams |

Estimated "Free Alcohol": 8.08% wt.

EXAMPLE 3

A toluene/ethanol/$MgCl_2$/benzyl alcohol solution was prepared in accordance with the procedure of Example 2 except less ethanol and benzyl alcohol was used. 57.2 grams of benzyl alcohol and 17.8 grams of ethanol were added. The final theoretical composition of this solution was:

| | |
|---|---|
| $ClMgOC_7H_7$ | 78 grams |

| "Free" benzyl alcohol | 6.7 grams |
|---|---|
| "Free" ethanol | 17.8 grams |
| Toluene | 287.5 grams |
| Total | 390 grams |

Estimated "Free Alcohol": 6.28% wt.

COMPARATIVE EXAMPLE 4

Magnesium chloride, 1.11 grams (0.012 mole) was transferred into a 150 ml vial in a dry box. Substantially pure, dry toluene (40 ml) was then added followed by 5.82 ml (0.056 mole) of benzyl alcohol with stirring. The vial was heated to refluxing temperature for about 5 minutes. At this point, 12.3 grams of butylethylmagnesium (10.5 wt. % in heptane, 0.011 mole Mg) was added dropwise to the vial with stirring. After the addition, the vial was maintained at a refluxing temperature for about 5 minutes. The final product was a white solid. This Example illustrates that a solid product was obtained when ethanol was not used in the preparation even if excess benzyl alcohol was present.

COMPARATIVE EXAMPLE 5

Following the procedure of Comparative Example 4, 1.12 grams of $MgCl_2$ (0.011 mole) was placed in a 150 ml vial along with 40 ml of toluene. Then, 4.5 ml of ethanol (3.53 grams, 0.077 mole) was added to the vial with stirring. The vial was heated to refluxing temperature for about 5 minutes. Then, 8.1 grams of butylethylmagnesium (15.6 wt. % in heptane, 0.011 mole Mg) was added dropwise to the vial. After the addition, the vial was maintained at a refluxing temperature for about 5 minutes. The final product, chloromagnesium ethoxide, was a white solid.

COMPARATIVE EXAMPLE 6

In a 150 ml vial, 40 ml of dry toluene was charged by syringe followed by 2 ml of ethanol (1.57 grams, 0.034 mole). Then, 8.0 grams of butylethylmagnesium (15.6 wt. % in heptane, 0.011 mole Mg) was added dropwise to the vial. During the addition, gas evolution was observed. After the addition, the vial was maintained at refluxing temperature for about 5 minutes. The final product, magnesium ethoxide, was a white solid.

EXAMPLE 7

Magnesium chloride, 1.11 grams (0.012 mole) of $MgCl_2$ was transferred into a 150 ml vial in a dry box. Substantially pure dry toluene (20 ml) was then charged by syringe. Under stirring, 3.47 grams (0.032 mole) of benzyl alcohol and 1.1 grams (0.024 mole) of ethanol were added to the vial. The vial was heated to a refluxing temperature for about 5 minutes. Then, 12.2 grams of butylethylmagnesium (10.5 wt. % in heptane, 0.011 mole Mg) was added dropwise to the vial with stirring. After the addition, the vial was maintained at a refluxing temperature for about 5 minutes. The final product was a colorless solution. This Example illustrates that a solvent mixture of toluene and heptane allows for production of the desired soluble product.

COMPARATIVE EXAMPLE 8

Magnesium metal (0.28 gram 0.012 mole) and 1.13 gram (0.011 mole) of magnesium metal were placed in a 150 ml vial. Dry toluene (60 ml) was charged into the vial by syringe without ethanol being present as well. Then 6.65 gram of benzyl alcohol (0.06 mole) was added into the vial with stirring. After addition the vial was maintained at refluxing temperature for about thirty minutes. The final product was a white solid.

The foregoing Examples are set forth for illustrative purposes only and should not, therefore, be construed in a limiting sense. The scope of protection sought is set forth in the claims which follow.

We claim:

1. A hydrocarbon soluble compound of the formula ROMgX, where X is halide and R is aralkylene.
2. A compound as claimed in claim 1 wherein R is of the formula R"R"' where R" is phenyl and R"' is alkylene.
3. A compound as claimed in claim 1 wherein R is benzyl.
4. A compound as claimed in claim 1 wherein X is chloride.
5. A compound as claimed in claim 2 wherein X is chloride.
6. A compound as claimed in claim 3 wherein X is chloride.
7. A hydrocarbon solution comprising the compound of claim 1.
8. A hydrocarbon solution comprising the compound of claim 2.
9. A hydrocarbon solution comprising the compound of claim 3.
10. A hydrocarbon solution comprising the compound of claim 4.
11. A hydrocarbon solution comprising the compound of claim 5.
12. A hydrocarbon solution comprising the compound of claim 6.

* * * * *